US009755921B2

(12) United States Patent
Thirumalai et al.

(10) Patent No.: US 9,755,921 B2
(45) Date of Patent: Sep. 5, 2017

(54) ELECTRONIC HEALTH AND WELFARE MONITORING OF NETWORK SERVER OPERATIONS

(71) Applicant: BANK OF AMERICA CORPORATION, Charlotte, NC (US)

(72) Inventors: Hariharan Thirumalai, Tamil Nadu (IN); Diptendra Kumar Srivastava, Uttarpradesh (IN)

(73) Assignee: Bank of America Corporation, Charlotte, NC (US)

( * ) Notice: Subject to any disclaimer, the term of this patent is extended or adjusted under 35 U.S.C. 154(b) by 289 days.

(21) Appl. No.: 14/588,428

(22) Filed: Jan. 1, 2015

(65) Prior Publication Data
US 2016/0197801 A1    Jul. 7, 2016

(51) Int. Cl.
*H04L 12/26* (2006.01)
*G06F 11/30* (2006.01)
*G06F 11/34* (2006.01)

(52) U.S. Cl.
CPC ........ *H04L 43/065* (2013.01); *H04L 43/0817* (2013.01); *G06F 11/3006* (2013.01); *G06F 11/3055* (2013.01); *G06F 11/3409* (2013.01); *G06F 2201/865* (2013.01); *G06F 2201/87* (2013.01)

(58) Field of Classification Search
CPC ... H04L 43/065; H04L 43/0817; H04L 43/12; H04L 43/16; H04L 43/103; H04L 41/06; G06F 11/30
USPC .................................................. 709/224–245
See application file for complete search history.

(56) References Cited

U.S. PATENT DOCUMENTS

| | | | |
|---|---|---|---|
| 7,581,006 B1* | 8/2009 | Lara .................... | H04L 67/1008 709/217 |
| 2008/0134046 A1* | 6/2008 | Gray .................... | G06F 11/328 715/736 |
| 2011/0131658 A1* | 6/2011 | Bahl .................... | G06F 21/577 726/25 |

* cited by examiner

*Primary Examiner* — David Lazaro
*Assistant Examiner* — Berhanu Shitayewoldetsad
(74) *Attorney, Agent, or Firm* — Michael A. Springs; Moore & Van Allen PLLC; Peter B. Stewart

(57) ABSTRACT

A computer implemented method for electronic monitoring of transaction processing system (TPS) applications is provided. The computer implemented method includes receiving TPS application data from at least two servers. The method further includes electronically executing health check software scripts on the TPS application data to determine a status of at least two TPS parameters. Additionally, the computer implemented method includes generating a historical report for at least one TPS parameter and presenting the historical report to a user via a single application.

18 Claims, 5 Drawing Sheets

Domain Connectivity

| Overall Domain | Regional Domain | Status |
|---|---|---|
| Domain XXXX | Reg. Domain AAAA | Active |
| Domain XXXX | Reg. Domain BBBB | Active |
| Domain XXXX | Reg. Domain CCCC | Active |
| Domain XXXX | Reg. Domain DDDD | Active |
| Domain XXXX | Reg. Domain EEEE | Active |
| Domain XXXX | Reg. Domain FFFF | Active |
| Domain XXXX | Reg. Domain GGGG | |
| Domain XXXX | Reg. Domain HHHH | |
| Domain XXXX | Reg. Domain IIII | |

FIGURE 5

ELECTRONIC HEALTH AND WELFARE MONITORING OF NETWORK SERVER OPERATIONS

BACKGROUND

Transaction processing system (TPS) applications electronically monitor a plurality of software applications associated with transaction processing on a distributed network. Specifically, a TPS application is a single application located on a client server. A user may monitor several distinct TPS applications, with each TPS application associated with a distinct client server. Current methods of monitoring the health of TPS applications involve users manually entering each application and running diagnostic software scripts. This can disrupt or affect operation of various TPS applications causing electronic processing disruptions. As such, a need exists for a centralized electronic TPS monitoring tool that allows for electronic monitoring of a plurality of TPS applications from a single access point.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for a centralized web-based monitoring tool for TPS applications. For example, a centralized monitoring tool configured to monitor the health status of multiple TPS applications is contemplated herein. The monitoring tool may monitor several geographically distinct applications, with each application comprising multiple TPS parameters such as servers, logs, shared memory, transactions, overall network, system events, file system space, CPU and memory consumption, current clients, user logs, domain connectivity, active transactions, network partition status, or queue blocking. In monitoring such data, the tool may be configured to present a status for each TPS parameter to a user via a single electronic portal, wherein the status of each TPS parameter is indicative of the health of each TPS parameter. Such a tool is beneficial in instances where a user would otherwise be required to manually log into each separate application to check the status of that application because this tool allows the user to check the status of multiple applications at one time.

In one embodiment, a system for electronically monitoring a plurality of software applications associated with transaction processing on a distributed network is provided. The system includes a computing platform comprising one or more processing devices and executable software code stored in one or more electronic storage devices, wherein the executable software code is configured to cause the one or more processing devices to receive software application data related to at least two servers in the distributed network. The software application data may represent transaction processing on the distributed network. The executable software code is also configured to execute health check software scripts on software application data to determine a status of at least two parameters. The executable software code is also configured to electronically present the status for each of the at least two parameters via an electronic portal. The executable software code is also configured to generate a historical report for the at least two parameters. Finally, the executable software code may also be configured to electronically present the historical report via the electronic portal.

In some embodiments of the system, the executable software code is configured to cause the one or more processing devices to execute health check software scripts on the software application data to determine a status of the at least two parameters involves parameters that may include an operating state or configuration of one or more servers, logs, shared memory, transactions, overall network, system events, file system space, CPU and memory consumption, current clients, user logs, domain connectivity, active transactions, network partition status, or queue blocking.

In some embodiments of the system, executing health check software scripts on the software application data involves executing the health check software scripts periodically. In some further embodiments of the system, the at least two parameters are ranked based on a risk severity, and executing the health check software scripts on the software application data further includes executing health check software scripts for a first parameter with a high risk severity at a higher frequency than for a second parameter with a low risk severity.

Some embodiments of the system further comprise executable software code configured to cause the one or more processing devices to store the status for the at least two parameters in a historical log database.

Some embodiments of the system further comprises executable software code configured to cause the one or more processing devices to electronically present the historical report only when there is a negative status of a first parameter, wherein a status is negative when the first parameter fails to meet a preconfigured standard of the health check software scripts.

Some embodiments of the system include electronically presenting, for each of the at least two parameters, a parameter name, a parameter description, a date of analysis, a time of analysis, a name of an associated application, a location of the associated application, or a risk severity, in addition to the status for each of the at least two parameters.

Another embodiment of the invention is a computer implemented method for electronically monitoring a plurality of software applications associated with transaction processing on a distributed network. In some embodiments, the computer implemented method comprises receiving, via a processing device, software application data related to at least two servers in the distributed network, wherein the software application data represent transaction processing on the distributed network. In some embodiments, the computer implemented method comprises executing, via a processing device, health check software scripts on the software application data to determine a status of at least two parameters. In some embodiments, the computer implemented method electronically presents, via a processing device, the status for the at least two parameters via an electronic portal. In some embodiments, the computer implemented method comprises generating, via a processing device, a historical report for the at least two parameters. Finally, some embodiments involve the computer implemented method electronically presenting, via a processing device, the historical report via the electronic portal.

In some embodiments of the computer implemented method, the computer implemented method further includes executing, via a processing device, health check software scripts on the software application data to determine a status of the at least two parameters, wherein the at least two parameters include an operating state or configuration of one or more servers, logs, shared memory, transactions, overall network, system events, file system space, CPU and memory consumption, current clients, user logs, domain connectivity, active transactions, network partition status, or queue blocking.

In some embodiments of the computer implemented method, the computer implemented method comprises executing, via a processing device, health check software scripts on the software application data comprises executing the health check software scripts periodically. In further embodiments, the at least two parameters are ranked based on a risk severity, and the computer implemented method comprises executing, via a processing device, health check software scripts on the software application data further includes executing health check software scripts for a first parameter with a high risk severity at a higher frequency than for a second parameter with a low risk severity In some embodiments of the method, the computer implemented method comprises electronically storing, via a processing device, the status for the at least two parameters in a historical log database.

Additionally, in some embodiments of the method, computer implemented method comprises electronically presenting, via a processing device, the historical report via an electronic portal comprises presenting the historical report only when there is a negative status of a first parameter, wherein a status is negative when the first parameter fails to meet a preconfigured standard of the health check software scripts.

Additionally, in some embodiments of the method, presenting the status for each of the at least two parameters further comprises electronically presenting, for each of the at least two parameters, a parameter name, a parameter description, a date of analysis, a time of analysis, a name of an associated application, a location of the associated application, or a risk severity.

In another embodiment, a computer program product for electronically monitoring a plurality of software applications associated with transaction processing on a distributed network is provided. The computer program product comprises non-transitory computer readable medium comprising computer readable instructions. The computer readable instructions may include receiving software application data for at least two servers in the distributed network, wherein the software application data represent transaction processing on the distributed network. The computer readable instructions may further include executing health check software scripts on the software application data to determine a status of at least two parameters. The computer readable instructions may further include presenting the status for each of the at least two parameters via an electronic portal. The computer readable instructions may further include generating a historical report for the at least two parameters. Finally, the computer readable instructions may further include presenting the historical report via the electronic portal.

Some embodiments of the computer program product further comprise executing health check software scripts on the software application data to determine a status of at least two parameters, wherein the at least two parameters include an operating state or configuration of one or more server, logs, shared memory, transactions, overall network, system events, file system space, CPU and memory consumption, current clients, user logs, domain connectivity, active transactions, network partition status, or queue blocking.

In some embodiments of the product, the instructions for executing health check software scripts on the at least two parameters further comprises instructions for executing the health check software scripts periodically. In this embodiment, the at least two parameters may be ranked based on a risk severity. In further embodiments, the computer program product further comprises instructions for executing health check software scripts for a first parameter with a high risk severity at a higher frequency than for a second parameter with a low risk severity.

In some embodiments of the product, the instructions further comprise instructions for saving the status for the at least two parameters in a historical log database.

Additionally, in some embodiments of the product, the instructions for presenting the historical report further comprises instruction for presenting the historical report only when there is a negative status of a first parameter, wherein a status is negative when the first parameter fails to meet a preconfigured standard of the health check software scripts.

Additionally, some embodiments of the product comprise presenting, for each of the at least two parameters, a parameter name, a parameter description, a date of analysis, a time of analysis, a name of an associated application, a location of the associated application, or a risk severity, in addition to the status of the at least two parameters.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself Thus, methods, systems, and computer program products are described herein that provide for a centralized web-based monitoring tool for transaction processing system (TPS) applications. TPS applications electronically monitor a plurality of software applications associated with transaction processing on a distributed network. Specifically, a TPS application is a single application located on a client server. A user may monitor several distinct TPS applications, with each TPS application associated with a distinct client server. An example of a TPS application that is monitored is the Tuxedo application. "Tuxedo application" refers to a middleware platform for transaction processing software developed by Oracle Corporation with headquarters in Redwood City, Calif.

A centralized monitoring tool configured to monitor the health status of multiple TPS applications associated with transaction processing on a distributed network is contemplated herein. The monitoring tool may monitor several geographically distinct applications, with each application comprising multiple TPS parameters such as servers, logs, shared memory, transactions, overall network, system events, file system space, CPU and memory consumption, current clients, user logs, domain connectivity, active transactions, network partition status, or queue blocking. In monitoring such data, the tool may be configured to present a status for each TPS parameter to a user via a single electronic portal such as a web application, wherein the status of each TPS parameter is indicative of the health of each TPS parameter. Such an electronic monitoring tool is beneficial in instances where a user would otherwise be required to manually log into each separate application to check the status of that application, as the disclosed electronic monitoring tool of the present invention allows the user to check the status of multiple applications at one time.

Figure 1:
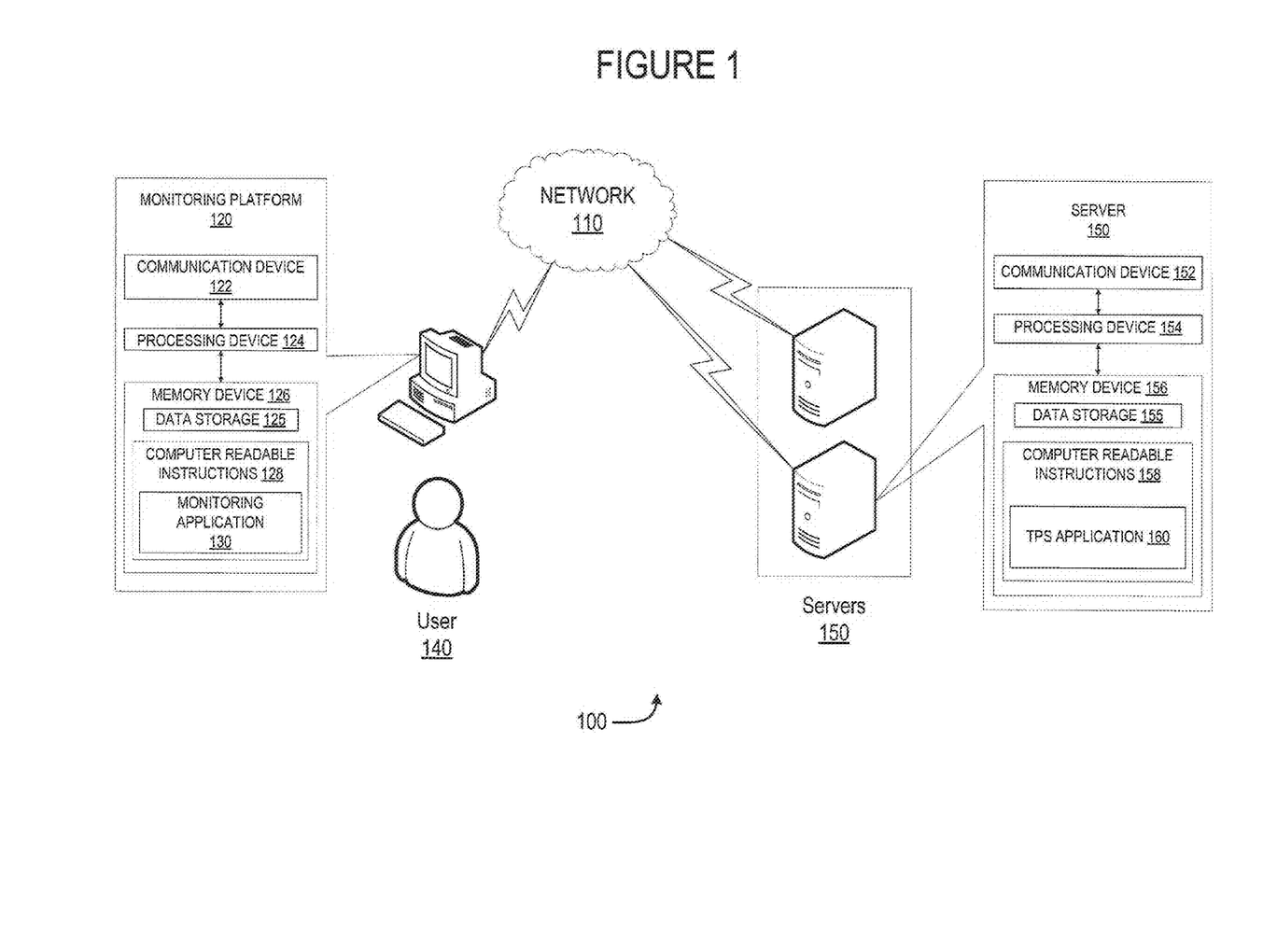
FIG. 1 is a block diagram illustrating a TPS application monitoring system, in accordance with an embodiment of the invention.

FIG. 1 illustrates an embodiment of a system 100 that may be utilized to monitor the health of TPS parameters of applications associated with transaction processing on a distributed network, such as, for example, TPS parameters associated with TPS applications. As illustrated, the system 100 may include a monitoring platform 120 in communication with a plurality of servers 150 connected via a monitoring network 110. A user 140 may be associated with the monitoring platform 120. Typically, such users 140 are technical personnel tasked with monitoring one or more servers 150. As illustrated, the monitoring platform 120 and the servers 150 each include a communication device 122 and 152, processing device 124 and 154, memory device 126 and 156, computer readable instructions 128 and 158, and a data storage 125 and 155.

As used with respect to the monitoring platform 120 and servers 150, a "communication device" 122 and 152 may generally include a modem, server, transceiver, and/or other device for communicating with other devices on a network. A "processing device," 124 and 154 may generally refer to a device or combination of devices having circuitry used for implementing the communication and/or logic functions of a particular system. For example, a processing device 124, 154 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory device 126, 156. As the phrase is used herein, a processing device may be "configured to" perform a certain function in a variety of ways, including, for example, particular computer-executable program code embodied in computer-readable medium, and/or by having one or more application-specific circuits perform the function. The processing device 124, 154 may be configured to use the communication device 122, 152 to transmit and/or receive data and/or commands to and/or from other devices within the network 110.

A "memory device" 126, 156 may generally refer to a device or combination of devices that store one or more forms of computer-readable media for storing data and/or computer-executable program code/instructions. For example, in one embodiment, the memory device 126, 156 may include any computer memory that provides an actual or virtual space to temporarily or permanently store data and/or commands provided to the processing device 124, 154 when it carries out its functions described herein. In one embodiment, the memory device 126 of the monitoring platform 120 includes computer readable instructions 128 that include a monitoring application 130 discussed more fully below. Furthermore, the memory device 156 of the servers 150 includes computer readable instructions 158 that include a TPS application 160 discussed more fully below. Additionally, in some embodiments, the memory device 126, 156 includes a data storage 125, 155 or database configured for storing information and/or data. In other embodiments, the data storage 125, 155 may be housed remotely from the monitoring platform 120 and the monitoring platform system 120 is in communication with the data storage 125, 155 across the network 110 and/or across some other communication link.

The monitoring network 110 may include a local area network (LAN), a wide area network (WAN), and/or a global area network (GAN). The network 110 may provide for wireline, wireless, or a combination of wireline and wireless communication between devices in the network. In some embodiments, the network 110 may include a wireless telephone network. In some embodiments, the network 110 includes the Internet. In some embodiments, the network 110 includes an intranet. Furthermore, the network 110 may include a combination of an intranet and the Internet. For example, in one embodiment, the network 110 includes an intranet as well as the Internet accessible via a De Militarized Zone (DMZ).

The TPS application 160 monitored by the system may include any type of application capable of processing, monitoring, or controlling transactions in a distributed network. In one embodiment, the TPS application 160 is a transaction processing system. Such a transaction processing system may support credit card or debit card applications such as customer authorization and transaction processing. In general, a TPS application 160 performs message, or request, routing and queuing. In this way, the TPS application 160 receives client transaction information and queues the request to a named queue. Queues can be ordered by message availability time, expiration time, priority, last in-first out, first in-first out, or a combination of these characteristics.

In some embodiments, the TPS application 160 contains a Bulletin Board (BB), or a shared memory segment that contains the configuration and state of a domain associated with the application. Servers, services, transactions, and clients may all be registered in the BB.

In some embodiments of the invention, the processing device 154 executes health check software scripts on the TPS application 160 data. The results of these health check software scripts are stored in data storage 155 or 125.

The monitoring application 130 accesses the results of the health check software scripts located in data storage 155 via the network 110, or the monitoring application 130 accesses the results of the health check software scripts located within the same monitoring platform 120 from data storage 125. The monitoring application 130 may then analyze the results and present an organized overview of the results electronically to the user 140.

Figure 2:
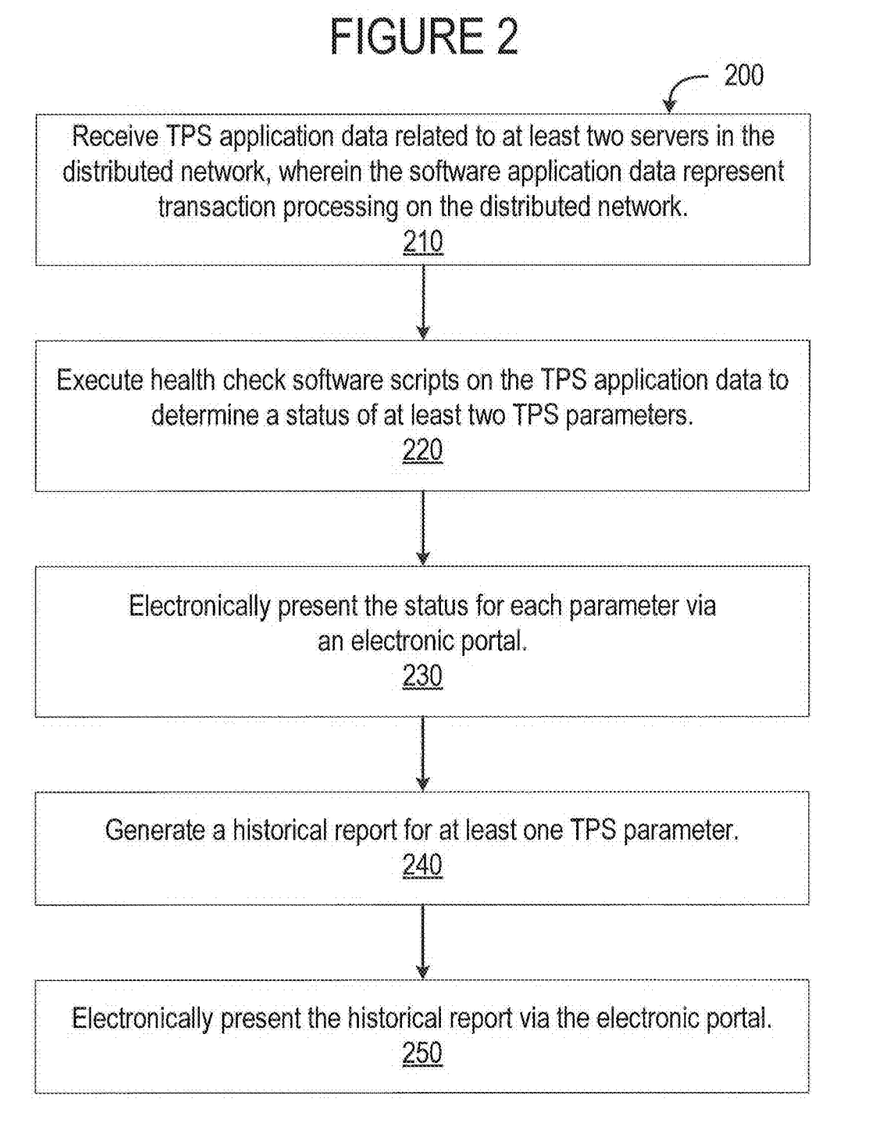
FIG. 2 is a flow chart illustrating a TPS application monitoring system, in accordance with an embodiment of the invention.

FIG. 2 is a flowchart of a TPS application monitoring system 200, in accordance with an embodiment of the invention. As illustrated by block 210, the system 200 receives TPS application data related to at least two servers in the distributed network, wherein the software application data represent transaction processing on the distributed network. In one embodiment, the TPS application data may be information related to the number of queued requests in each queue, the number of requests currently processing in the TPS application, server connectivity, TPS application efficiency, and similar information related to the status of the TPS application on a server. In some embodiments the network server may be a client server. In some embodiments, the network servers are located in separate geographic locations. For example, one server (or one set of servers) may be located in one country while a second server may be located in a different country. Further, there may be different versions of the application. In such an embodiment, the servers may support different versions of the TPS application.

As illustrated by block 220, the system 200 then executes health check software scripts on the TPS application data to determine a status of at least two TPS parameters. In some embodiments, a health check software script is a pre-written set of software code with pre-determined parameters for which types of TPS application data will be analyzed. For example, the health check software scripts may only pull TPS application data related to a single TPS parameter, such as a number of queuing requests in a specific queue within the TPS application. In some embodiments, a health check software script comprises a pre-determined output based on the results of executing the scripts. To continue the earlier example, the health check software script may determine that the number of queuing results in a specific queue is above a pre-determined overload value and therefore the health check software script may provide an output of "Queue A overload." Alternatively, the health check software script may simply provide an output of "healthy" or "unhealthy" for each TPS parameter. As another example, an executing health check software script may determine a server has weak or no connectivity to the network, so the health check software script may provide an output of "weak server connection" or "no server connection." The results of the executed health check software scripts are then saved in a data storage, either within the network server or within the monitoring platform.

In some embodiments, the system 200 executes the health check software scripts upon a command of a user. In some embodiments, the system executes the health check software scripts periodically. For example, the health check software scripts may execute every minute, every 30 minutes, every 4 hours, or every 24 hours. In some embodiments, a user provides a risk severity ranking for each TPS parameter. In such an embodiment, the system executes health check software scripts for TPS parameters with a high risk severity at a periodic frequency that is higher than the periodic frequency for a TPS parameter with a low risk severity. For example, a user may determine that TPS parameter "request queue length of Queue A" has a low risk severity ranking while TPS parameter "Server Z connectivity" has a high risk severity ranking In such a scenario, the system may run health check software scripts on the request queue length of Queue A every 4 hours while running health check software scripts on the connectivity of Server Z every 15 minutes.

As illustrated by block 230, the system 200 then electronically presents the status for each parameter via an electronic portal, such as a single web application. In such an embodiment, the results of the health check software scripts for each TPS application are retrieved from a data storage (either located on the separate servers or directly from the monitoring platform). The system may then organize the results and display the results on a single electronic portal for easy analysis by a user. In some embodiments, the results are organized and displayed based on the server where the TPS parameter is located. For example, when considering Server A, a heading of "Server A" may be presented and the results for each TPS parameter of Server A may be listed below the heading.

In other embodiments, the status results are organized and displayed based on the type of TPS parameter. In such an embodiment, the system would list the status results for each server under each TPS parameter. For example, when considering a TPS parameter of request queue length, a heading of "Request Queue Length" may be presented and the status results for Server A, Server B, and Server C are listed below the heading. In some embodiments, all TPS parameters, and the status results for the TPS parameter for each server, are displayed on a single web page. In other embodiments, a sidebar dropdown menu allows a user to select which TPS parameter status results to be displayed by the server.

In some embodiments, a status signal is displayed alongside, or in lieu of, the TPS parameter status results. The status signal may be a word or group of words describing the status of the TPS parameter. Examples of such a status signal include "healthy," "unhealthy," "error," "active," "inactive," or the like. In other embodiments, the status signal may include a non-word signal, such as a green light, a red light, a check mark, an "x," or the like. In some embodiments, a status signal may be a range of a TPS parameter. For example, a status result for a TPS parameter may provide a list of the number of requests queued within a specific queue over a period of time. In such an embodiment, the status signal may provide a range of queued requests by displaying a minimum and maximum value of the number of requests queued.

In any embodiment, the status results of TPS parameters for multiple TPS applications are displayed to a user via a single electronic portal. In some embodiments, the electronic portal may display all results on a single web page. In other embodiments, the electronic portal may provide a home page with links to the status results of TPS parameters. For example, an electronic portal may include links to each server, and therefore each distinct TPS application, supported by the system. When a user selects a link for a TPS application, the electronic portal then displays a list of status results for the TPS parameters of that TPS application. As another example, the electronic portal may include links to each TPS parameter analyzed by the system. When a user selects a link for a TPS parameter, the electronic portal then displays a list of status results for that TPS parameter for that TPS application. In some embodiments, the status results of the TPS parameters may be analyzed by region. For example, the electronic portal may display the status results for all TPS parameters from TPS applications located in a geographic country. In some embodiments, the electronic portal may display the status results of TPS parameters based on a combination of any or all of these previous embodiments.

The singular nature of the electronic portal allows a user to analyze all TPS parameters for a large network of geographically distinct servers and TPS applications under one holistic system. Displaying status results for each TPS parameter in one virtual location saves a user from logging into each distinct server, executing health check software scripts on each distinct server, and analyzing results for each server, one at a time. This increased efficiency allows a user tasked with network maintenance to spend more time determining solutions to network health problems and less time determining if or where TPS parameters are not performing as expected.

As illustrated by block 240, the system 200 generates a historical report for at least one TPS parameter 160. This historical report may include information relevant to the specific TPS parameter or the TPS application from where the specified TPS parameter is derived. The historical report may include information about previous failures of the TPS parameter, including dates and times of previous failures, time since the last failure, descriptions of how or why previous failures occurred, historical solutions for such failures, or notes by a previous user related to the health or maintenance of the TPS parameter at issue. In some embodiments, a historical report is created for each of a multitude of TPS parameters. In some embodiments, a historical report is only provided when a TPS parameter is determined to have a non-ideal status. In such an embodiment, the system only provides historical information when a user might need assistance in determining the cause of a TPS parameter failure or the process necessary to remedy such failure.

As illustrated by block 250, the system 200 then presents the historical report via the electronic portal. In some embodiments, a historical report is only provided when a TPS parameter is determined to have a non-ideal status. In such an embodiment, the system only provides historical information when a user might need assistance in determining the cause of a TPS parameter failure or the process necessary to remedy the failure. In some embodiments, the historical report is presented to the user via a link in the electronic portal. In other embodiments, the historical report is available to the user via a dropdown menu. In other embodiments, the historical report is automatically sent to the user via electronic mail, SMS message, or other electronic communication.

In some embodiments, the system 200 records the current status results for the TPS parameters. The recorded status results may be added to historical reports for a TPS parameter, or a new historical report may be created for a TPS parameter with no error history. In some embodiments, the system may prompt the user to provide feedback or general notes about the issue with the TPS parameter. For example, if a user determines there is an issue with TPS parameter XYZ, then the user may provide feedback as to what the issue is, how the issue was created, a solution used by the user, and any other notes about the TPS parameter XYZ and the user's analysis. This user feedback may be helpful to future users encountering the same or a similar issue with TPS parameter XYZ in the future, as the system will include the user's feedback within a historical report the next time the system displays an error with TPS parameter XYZ.

Figure 3:
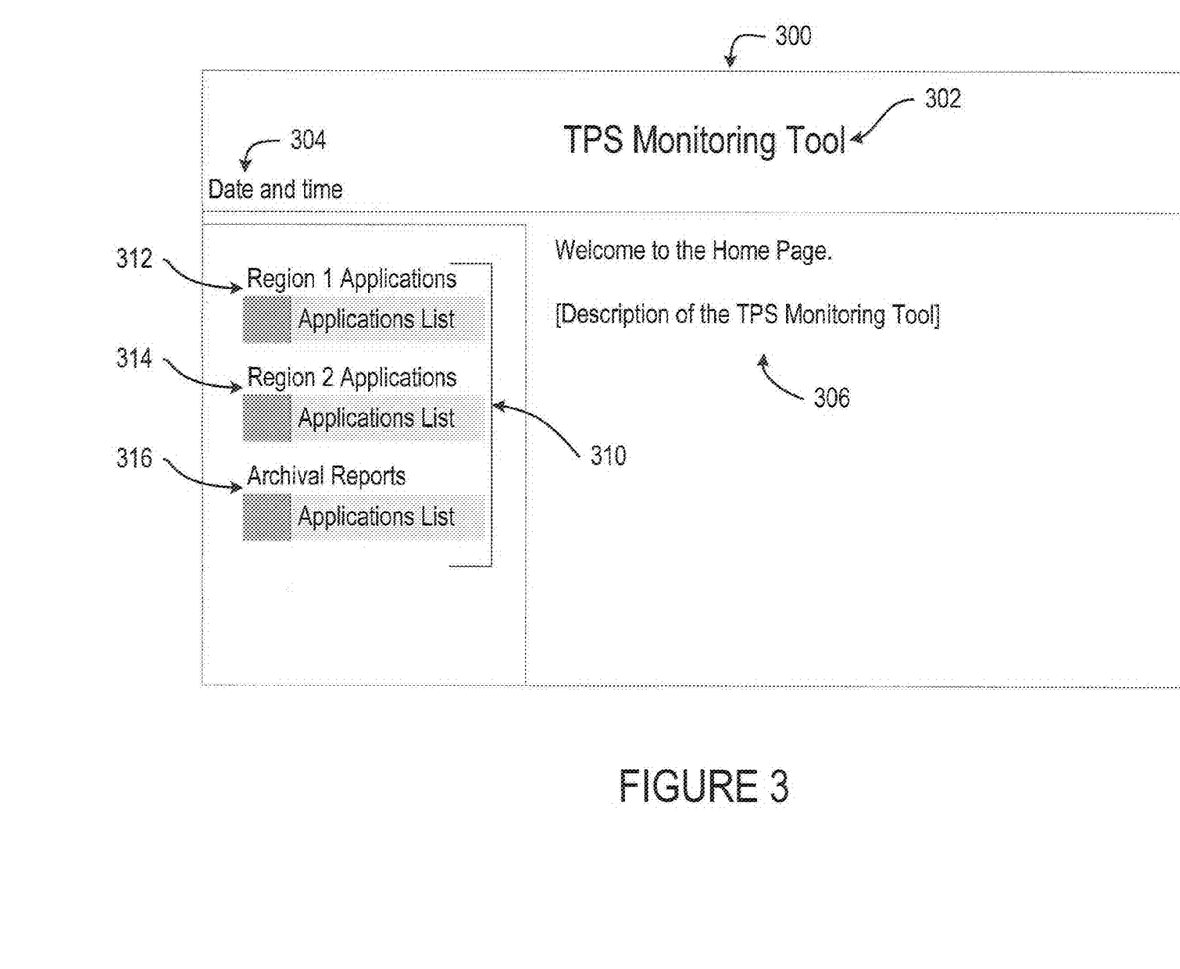
FIG. 3 is a sample display illustrating a home page and drop-down menus of an electronic portal, in accordance with embodiments of the present invention.

FIG. 3 is a depiction of a screen shot showing a home page of an electronic portal 300 and drop-down menus 310, in accordance with embodiments of the present invention. In this embodiment, the electronic portal home page 300 includes a title 302, date and time 304, and a welcome message with a description and/or instructions 306. The dropdown menus 310 in this embodiment comprise an Application List for Region 1 Applications 312, an Application List for Region 2 Applications 314, and an Applications List for Archival Reports 316. The Archival Reports 316 may be the same as historical reports, as described in earlier embodiments. In some embodiments, more than two regions are analyzed. In such embodiments, more than two regional application lists are provided in the dropdown menu.

In one embodiment, the drop-down menu Region 1 Applications 312 includes selectable links to the following reports of systems and services from Region 2: Common Services, Client Systems, Online Systems, Administrative Systems, Management Systems, Security Systems, Network Systems, and Technology Infrastructure Systems. In one embodiment, the invention reaches out to these systems and provides a report of TPS parameters for each system, based on the output of the systems.

In one embodiment, the drop-down menu Region 2 Applications 314 includes selectable links to the following reports of systems and services from Region 2: Common Services, Client Systems, Online Systems, Administrative Systems, Management Systems, Security Systems, Network Systems, and Technology Infrastructure Systems. In one embodiment, the invention reaches out to these systems and provides a report of TPS parameters for each system, based on the output of the systems.

In one embodiment, the drop-down menu Archival Reports 316 includes selectable links to the following historical reports of systems and services: Common Services, Client Systems, Online Systems, Administrative Systems, Management Systems, Security Systems, Network Systems, and Technology Infrastructure Systems. In one embodiment, the invention reaches out to these systems and provides a report of TPS parameters for each system, based on the output of the systems.

Figure 4:
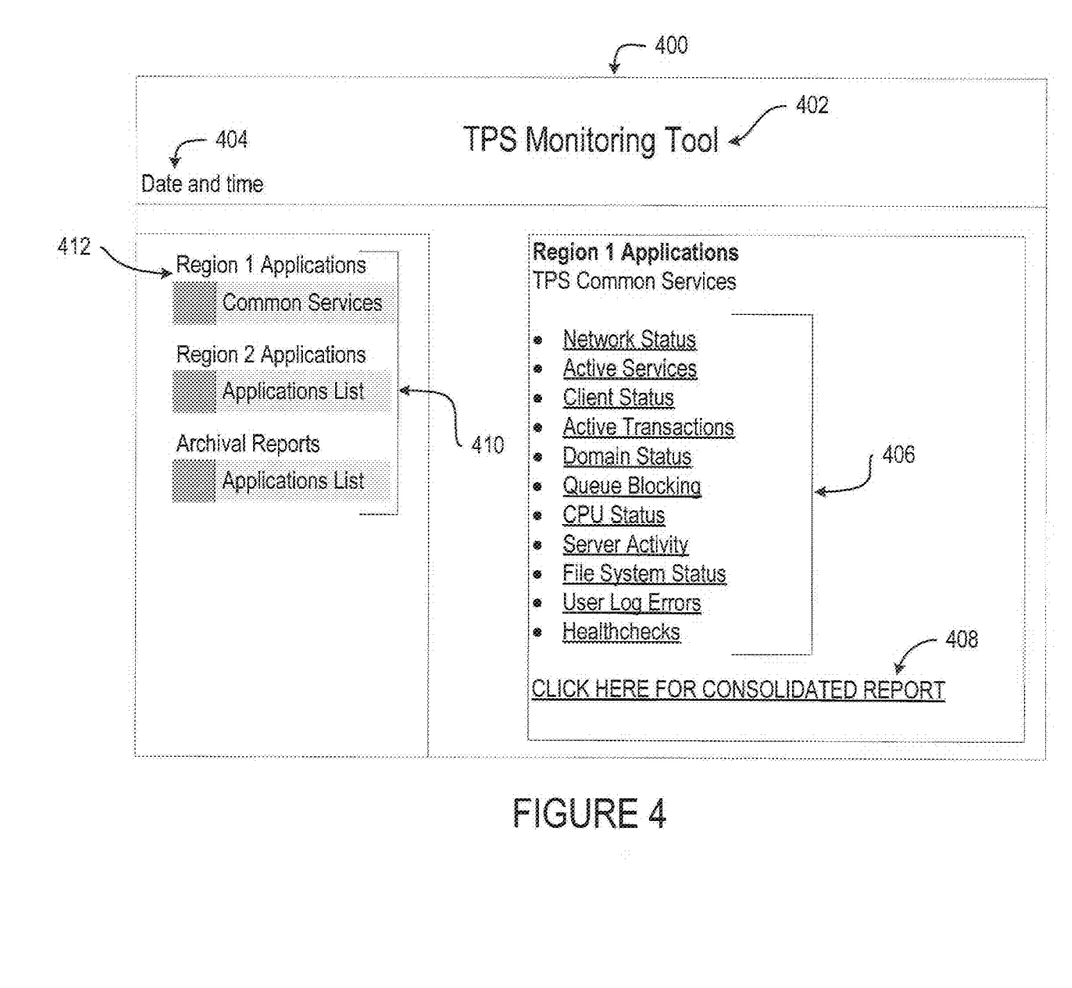
FIG. 4 is a sample display illustrating an electronic portal of the TPS monitoring tool, in accordance with an embodiment of the invention.

FIG. 4 is a depiction of a screenshot of an electronic portal 400 of the TPS monitoring tool, in accordance with an embodiment of the invention. The electronic portal 400 includes a title 402, date and time 404, and a side-bar drop-down window 410. In the represented embodiment of the system, a user has selected "Common Services" from the Applications List of Region 1 Applications 412. A list of TPS parameters 406 relating to Common Services are displayed in bullet notation form, with each individual TPS parameter containing a hyperlink. In one embodiment, the system allows a user to select a hyperlink of a specific TPS parameter. The system then may display a status of the selected TPS parameter. For example, a user may select "Server Activity" from the list of TPS parameters 406. The system would then display the results of the health check software scripts for the TPS parameter of server activity. Alternatively, the system may allow a user to select a hyperlink for a consolidated report 408. If a user selects the link for a consolidated report 408, the system may then display the results of the health check software scripts for all TPS parameters in the list of TPS parameters 406.

Figure 5:
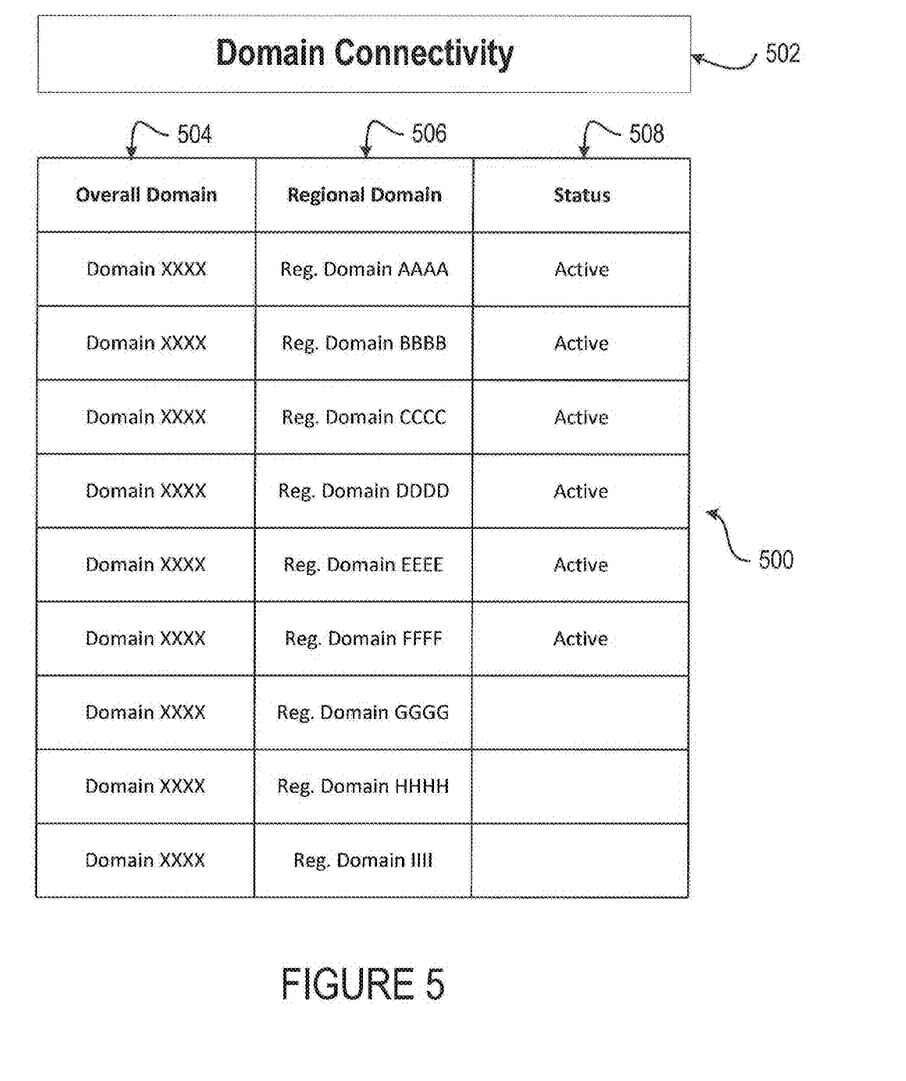
FIG. 5 is a sample display illustrating an electronic portal of the TPS monitoring tool, in accordance with an embodiment of the invention.

FIG. 5 illustrates a sample screen shot of an electronic portal 500 of a TPS monitoring tool, in accordance with an embodiment of the invention. Specifically, FIG. 5 illustrates part of a display generated by the system 100 when a user selects "Domain Status" from the list of TPS parameters 406 in FIG. 4. Note that a domain may be a central translocation domain. The display may include a title 502, in this case "Domain Connectivity," and three columns for organization of the Domain Connectivity TPS parameter statuses. The first column 504 names the overall domain. The second column 506, describes the regional domain. The third column 508 provides the status results of the Domain Connectivity TPS parameters. The status results in this embodiment include "Active" for domains that are currently connected and do not provide a status result for domains that are not connected.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronically monitoring a plurality of software applications associated with transaction processing on a distributed network, said system comprising:
a computing platform comprising one or more processing devices and executable software code stored in one or more electronic storage devices, wherein the executable software code is configured to cause the one or more processing devices to:
receive software application data related to at least two servers in the distributed network, wherein the software application data represent transaction processing on the distributed network;
identify at least two parameters associated with the software application data, wherein the at least two parameters include an operating state or configuration of one or more servers, logs, shared memory, transactions, overall network, system events, file system space, CPU and memory consumption, current clients, user logs, domain connectivity, active transactions, network partition status, or queue blocking;
determine a susceptibility severity level for each of the at least two parameters;
execute health check software scripts periodically on the software application data to determine a status of the at least two parameters,
wherein executing the health check software scripts further comprises executing the health check software scripts for a first parameter of the at least two parameters at a higher frequency than for a second parameter of the at least two parameters, and
wherein the first parameter is associated with a higher susceptibility severity level than the second parameter;
electronically present the status for each of the at least two parameters via an electronic portal;
generate a historical report for the at least two parameters; and
electronically present the historical report via the electronic portal,
wherein electronically presenting the historical report comprises presenting, for each of the at least two parameters, the determined status, a parameter name, a parameter description, a date of the health check software scripts analysis, a time of the health check software scripts analysis, a name of an associated application, a location of the associated application, and the susceptibility severity level, and
wherein the historical report is electronically presented only in response to determining a negative status for a failed parameter of the at least two parameters, wherein the negative status is an indication that the failed parameter did not meet a predetermined standard of the health check software scripts.

2. The system of claim 1, further comprising executable software code configured to cause the one or more processing devices to store the status for the at least two parameters in a historical log database.

3. The system of claim 1, wherein the first parameter comprises the operating state or the configuration of the one or more servers and wherein the second parameter comprises the operating state or the configuration of the shared memory.

4. The system of claim 1, wherein the first parameter comprises the operating state or the configuration of the one or more servers and wherein the second parameter comprises the operating state or the configuration of the transactions.

5. The system of claim 1, wherein the first parameter comprises the operating state or the configuration of the overall network and wherein the second parameter comprises the operating state or the configuration of the file system space.

6. The system of claim 1, wherein the first parameter comprises the operating state or the configuration of the overall network and wherein the second parameter comprises the operating state or the configuration of the CPU and memory consumption.

7. A computer implemented method for electronically monitoring a plurality of software applications associated with transaction processing on a distributed network, said computer implemented method comprising:
receiving, via a processing device, software application data related to at least two servers in the distributed network, wherein the software application data represent transaction processing on the distributed network;
identifying, via a processing device, at least two parameters associated with the software application data, wherein the at least two parameters include an operating state or configuration of one or more severs, logs, shared memory, transactions, overall network, system events, file system space, CPU and memory consumption, currently clients, user logs, domain connectivity, active transactions, network partition status, or queue blocking;
determining, via a processing device, a susceptibility severity level for each of the at least two parameters;
executing, via a processing device, health check software scripts periodically on the software application data to determine a status of the at least two parameters,
wherein executing the health check software scripts further comprises executing the health check software scripts for a first parameter of the at least two parameters at a higher frequency than for a second parameter of the at least two parameters, and
wherein the first parameter is associated with a higher susceptibility severity level than the second parameter;
electronically presenting, via a processing device, the status for each of the at least two parameters via an electronic portal;
generating, via a processing device, a historical report for the at least two parameters; and
electronically presenting, via a processing device, the historical report via the electronic portal,
wherein electronically presenting the historical report comprises presenting, for each of the at least two parameters, the determined status, a parameter name, a parameter description, a date of the health check software scripts analysis, a time of the health check software scripts analysis, a name of an associated application, a location of the associated application, and the susceptibility severity level, and wherein the historical report is electronically presented only in response to determining a negative status for a failed parameter of the at least two parameters, wherein the negative status is an indication that the failed parameter did not meet a predetermined standard of the health check software scripts.

8. The computer implemented method of claim 7 further comprising electronically storing, via a processing device, the status for the at least two parameters in a historical log database.

9. The computer implemented method of claim 7, wherein the first parameter comprises the operating state or the configuration of the one or more servers and wherein the second parameter comprises the operating state or the configuration of the shared memory.

10. The computer implemented method of claim 7, wherein the first parameter comprises the operating state or the configuration of the one or more servers and wherein the second parameter comprises the operating state or the configuration of the transactions.

11. The computer implemented method of claim 7, wherein the first parameter comprises the operating state or the configuration of the overall network and wherein the second parameter comprises the operating state or the configuration of the file system space.

12. The computer implemented method of claim 7, wherein the first parameter comprises the operating state or the configuration of the overall network and wherein the second parameter comprises the operating state or the configuration of the CPU and memory consumption.

13. A computer program product for electronically monitoring a plurality of software applications associated with transaction processing on a distributed network, the computer program product comprising a non-transitory computer readable medium comprising computer readable instructions, the instructions comprising instructions for:

receiving software application data for at least two servers in the distributed network, wherein the software application data represent transaction processing on the distributed network;

identifying at least two parameters associated with the software application data, wherein the at least two parameters include an operating state or configuration of one or more servers, logs, shared memory, transactions, overall network, system events, file system space, CPU and memory consumption, current clients, user logs, domain connectivity, active transactions, network partition status, or queue blocking;

determining a susceptibility severity level for each of the at least two parameters;

executing health check software scripts periodically on the software application data to determine a status of the at least two parameters, wherein executing the health check software scripts further comprises executing the health check software scripts for a first parameter of the at least two parameters at a higher frequency than for a second parameter of the at least two parameters, and wherein the first parameter is associated with a higher susceptibility severity level than the second parameter;

electronically presenting the status for each of the at least two parameters via an electronic portal;

generating a historical report for the at least two parameters; and electronically presenting the historical report via the electronic portal, wherein electronically presenting the historical report comprises presenting, for each of the at least two parameters, the determined status, a parameter name, a parameter description, a date of the health check software scripts analysis, a time of the health check software scripts analysis, a name of an associated application, a location of the associated application, and the susceptibility severity level, and wherein the historical report is electronically presented only in response to determining a negative status for a failed parameter of the at least two parameters, wherein the negative status is an indication that the failed parameter did not meet a predetermined standard of the health check software scripts.

14. The computer program product of claim 13, further comprising instructions for saving the status for the at least two parameters in a historical log database.

15. The computer program product of claim 13, where wherein the first parameter comprises the operating state or the configuration of the one or more servers and wherein the second parameter comprises the operating state or the configuration of the shared memory.

16. The computer program product of claim 13, wherein the first parameter comprises the operating state or the configuration of the one or more servers and wherein the second parameter comprises the operating state or the configuration of the transactions.

17. The computer program product of claim 13, wherein the first parameter comprises the operating state or the configuration of the overall network and wherein the second parameter comprises the operating state or the configuration of the file system space.

18. The computer program product of claim 13, wherein the first parameter comprises the operating state or the configuration of the overall network and wherein the second parameter comprises the operating state or the configuration of the CPU and memory consumption.

* * * * *